United States Patent
Tsang et al.

(10) Patent No.: US 11,370,163 B2
(45) Date of Patent: Jun. 28, 2022

(54) EXTRUSION-BASED ADDITIVE MANUFACTURING METHOD

(71) Applicant: SIGNIFY HOLDING B.V., Eindhoven (NL)

(72) Inventors: Peter Tjin Sjoe Kong Tsang, Eindhoven (NL); Coen Theodorus Hubertus Fransiscus Liedenbaum, Eindhoven (NL); Hendrik Jan Kettelarij, Eindhoven (NL); Hans Kroes, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 281 days.

(21) Appl. No.: 16/340,839

(22) PCT Filed: Oct. 9, 2017

(86) PCT No.: PCT/EP2017/075640
§ 371 (c)(1),
(2) Date: Apr. 10, 2019

(87) PCT Pub. No.: WO2018/069227
PCT Pub. Date: Apr. 19, 2018

(65) Prior Publication Data
US 2019/0263053 A1    Aug. 29, 2019

(30) Foreign Application Priority Data
Oct. 13, 2016   (EP) ...................................... 16193754

(51) Int. Cl.
*B29C 64/118*   (2017.01)
*B33Y 10/00*    (2015.01)
(Continued)

(52) U.S. Cl.
CPC .......... *B29C 64/118* (2017.08); *B29C 64/209* (2017.08); *B29C 64/386* (2017.08);
(Continued)

(58) Field of Classification Search
CPC ....... B29C 64/118; B33Y 10/00; B33Y 40/00; B33Y 30/00
See application file for complete search history.

(56) References Cited

U.S. PATENT DOCUMENTS

| 6,030,199 A | * | 2/2000 | Tseng | C04B 35/14 425/132 |
| 2010/0327479 A1 | * | 12/2010 | Zinniel | B29C 64/118 264/172.14 |

(Continued)

FOREIGN PATENT DOCUMENTS

| CN | 105599108 A | 5/2016 |
| CN | 105946091 A | 9/2016 |

(Continued)

*Primary Examiner* — Nathan T Leong
(74) *Attorney, Agent, or Firm* — Daniel J. Piotrowski

(57) ABSTRACT

A printer head (200, 300, 400) for a 3D-printing apparatus, comprising a nozzle (210, 310, 450) arranged to deposit one or more adjacently arranged filaments of printing material to form at least one layer of an object to be produced. The nozzle comprises at least one exterior surface (220) configured to be brought into abutting contact with a peripheral edge (280) of the at least one layer, and configured to be guided along the peripheral edge of the at least one layer and on a predetermined distance into the at least one layer.

3 Claims, 3 Drawing Sheets

(51) Int. Cl.
  *B33Y 50/02* (2015.01)
  *B29C 64/209* (2017.01)
  *B29C 64/393* (2017.01)
  *B33Y 50/00* (2015.01)
  *B29C 64/386* (2017.01)
  *B33Y 40/00* (2020.01)
  *B33Y 30/00* (2015.01)

(52) U.S. Cl.
  CPC ............ *B29C 64/393* (2017.08); *B33Y 10/00* (2014.12); *B33Y 40/00* (2014.12); *B33Y 50/00* (2014.12); *B33Y 50/02* (2014.12); *B33Y 30/00* (2014.12)

(56) References Cited

U.S. PATENT DOCUMENTS

| | | |
|---|---|---|
| 2014/0048969 A1 | 2/2014 | Swanson et al. |
| 2015/0367375 A1 | 12/2015 | Page |
| 2016/0009029 A1 | 1/2016 | Cohen et al. |
| 2016/0052016 A1 | 2/2016 | Te et al. |
| 2016/0067924 A1 | 3/2016 | Yasuda et al. |
| 2016/0288424 A1 | 10/2016 | Susnjara |
| 2017/0252851 A1* | 9/2017 | Fulop ................. B23K 11/0013 |

FOREIGN PATENT DOCUMENTS

| | | |
|---|---|---|
| DE | 102014220082 A1 | 4/2016 |
| JP | 2000024755 A | 1/2000 |
| JP | 2015189024 A | 11/2015 |
| JP | 2016013621 A | 1/2016 |
| JP | 2016141094 A | 8/2016 |
| WO | 2015012992 A2 | 1/2015 |
| WO | 2016011995 A1 | 1/2016 |

* cited by examiner

EXTRUSION-BASED ADDITIVE MANUFACTURING METHOD

CROSS-REFERENCE TO PRIOR APPLICATIONS

This application is the U.S. National Phase application under 35 U.S.C. § 371 of International Application No. PCT/EP2017/075640, filed on Oct. 9, 2017, which claims the benefit of European Patent Application No. 16193754.5, filed on Oct. 13, 2016. These applications are hereby incorporated by reference herein.

FIELD OF THE INVENTION

The present invention generally relates to the field of additive manufacturing, which is sometimes also referred to as 3D printing. More specifically, the present invention relates to an extrusion-based additive manufacturing method for manufacturing an object using a 3D-printing apparatus. The present invention also relates to a computer program and to a computer-readable data carrier having stored thereon the computer program, wherein the computer program comprises instructions which, when the program is executed by a 3D-printing apparatus, cause the 3D-printing apparatus to carry out the steps of the method.

BACKGROUND OF THE INVENTION

Additive manufacturing, sometimes also referred to as 3D printing, refers to processes used to synthesize a three-dimensional object. 3D printing is rapidly gaining popularity because of its ability to perform rapid prototyping without the need for assembly or molding techniques to form the desired article.

The object may be formed using a 3D-printing apparatus that builds the object in three dimensions in a number of printing steps that are usually controlled by a computer model. For example, a sliced 3D model of the object may be provided in which each slice is recreated by the 3D-printing apparatus in a discrete printing step. The 3D-printing apparatus may deposit successive layers of an extrudable material from a dispenser, and the layers may be cured or otherwise hardened after deposition, e.g. using a laser to induce the curing process.

An example of a 3D-printing apparatus is disclosed in US 2010/0327479 A1. This 3D-printing apparatus is an extrusion-based additive manufacturing system that can be used to build a 3D object from a digital representation of the 3D object in a layer-by-layer manner by extruding a flowable consumable modeling material filament through an extrusion tip carried by an extrusion head, and by depositing the modeling material on a substrate. This extrusion-based additive manufacturing method is also referred to as fused deposition modeling, fused layer modeling, or fused filament fabrication.

The majority of consumer 3D printers for performing the aforementioned extrusion-based additive manufacturing method comprise a moving head into which a plastic filament is fed. However, printers of this kind may suffer from the drawback of manufacturing objects which often show imperfections as a result of the method of deposition. For example, these imperfections may include ridges and/or stepped structures, also referred to as "staircase" structures, as a result of successive deposition of individual filaments onto a previously set filament layer. Ridges may occur as the deposited material at its edges can flow due to minimal surface tension, resulting in rounded edges.

Ridges and/or staircase structures may not only be detrimental to the structural integrity (creating many initiators for cracks and delamination) and overall part tolerances of the printed object, they may also be aesthetically unpleasing. To avoid this, methods for smoothing the surfaces have been suggested, e.g. by means of solvent vapors, paintings and/or coatings. However, a significant drawback of these methods is that they require one or more extra processing steps.

Hence, alternative solutions are of interest which are able to eliminate or reduce ridges and/or staircase structures of 3D-printed objects, such that the objects produced may become more stable, more easily integrated and/or more aesthetically pleasing.

SUMMARY OF THE INVENTION

It is an object of the present invention to mitigate the above problems and to provide a method for creating objects by means of extrusion-based additive manufacturing (3D printing), wherein the objects so produced have improved stability, integration and/or visual properties compared to objects produced by extrusion-based additive manufacturing (3D printing) according to the prior art.

According to a first aspect of the present invention, there is provided a method of smoothing the peripheral edge of one of more layers comprising one or more adjacently arranged filaments of printing material. The method is an extrusion-based additive manufacturing method for manufacturing an object using a 3D-printing apparatus, wherein the 3D-printing apparatus comprises a nozzle arranged to deposit one or more adjacently arranged filaments of printing material, and wherein the nozzle comprises at least one exterior surface. The method comprises the step of depositing the one or more adjacently arranged filaments of printing material to form at least one layer of the object. The method furthermore comprises the steps of bringing the at least one exterior surface of the nozzle into abutting contact with the peripheral edge of the at least one layer and guiding the nozzle along the peripheral edge of the at least one layer and on a predetermined distance into the at least one layer.

Thus, the present invention is based on the idea of providing a printer head for a 3D-printing apparatus which is configured to print at least one layer comprising one or more filaments of printing material, and then smooth out the at least one layer. In other words, after depositing one or more adjacently arranged filaments of printing material, the nozzle itself is used for smoothening out the layer(s), as the exterior surface(s) of the nozzle may be guided along the peripheral edge(s) of the layer(s) after the layer(s) has (have) been printed.

The present invention is advantageous in that the nozzle of the printer head may function both as an extruder and as a smoothening element. In other words, an object may be printed by the printer head, and any occurring ridges and/or staircase structures may hereby be smoothened without any additional processing steps after printing including solvent vapors, paintings and/or coatings. The present invention hereby provides a cost- and/or time-saving operation by the printer head.

The present invention is further advantageous in that ridges and/or staircase structures of 3D-printed objects may be conveniently eliminated or reduced by the printer head after printing, such that the objects produced by the 3D-printing apparatus may become more stable, more easily integrated and/or more aesthetically pleasing.

The printer head of the 3D-printing apparatus used in the method according to the present invention comprises a nozzle arranged to deposit one or more adjacently arranged filaments of printing material to form at least one layer of an object to be produced. Hence, a layer may comprise one filament (i.e. string) of printing material to form a layer, or a plurality of filaments of printing material arranged adjacently to form a layer. By "printing material", it is here meant a material which can be extruded, e.g. an extruded plastic material. The nozzle comprises at least one exterior surface configured to be brought into abutting contact with the peripheral edge of the at least one layer. By "exterior surface", it is here meant an outside surface or side portion of the nozzle. The nozzle is furthermore configured to be guided along the peripheral edge of the layer(s). By "peripheral edge", it is here meant an outer (side) edge of the layer(s). The nozzle is furthermore configured to be guided on a predetermined distance into the at least one layer. In other words, the nozzle is configured to be led and/or pressed into the layer(s) of the printed material, which are to be smoothened.

At least a portion of the peripheral edge of the at least one layer may comprise a semi-spherical shape which projects in the plane of the at least one layer, and the predetermined distance may correspond to a radius of the semi-spherical shape. Hence, in the method the nozzle may be guided along the peripheral edge of the at least one layer such that the radius of a layer having a semi-spherical shape is smoothened. This is advantageous in that the nozzle is guided along the layer edge(s) into an appropriate distance into the layer material, such that layer edges may be conveniently flattened.

The nozzle of the 3D-printing apparatus used in the method according to the invention may elongate along a first axis and while performing the method the nozzle may be guided a predetermined distance along the first axis. In other words, the method comprises the step of guiding the nozzle in the same direction as its elongation (which commonly is in a vertical direction). This is advantageous in that the peripheral edge of the layer(s) may be conveniently smoothened, e.g. in a vertical direction.

The nozzle of the 3D-printing apparatus used in the method according to the invention may elongate along a first axis and the at least one exterior surface may comprise at least one plane which is parallel to the first axis. Hence, the exterior surface of the nozzle, which brought into abutting contact with the peripheral edge of the layer(s) while performing the method, may comprise one or more planes. This is advantageous in that the nozzle efficiently and conveniently smoothens out the layer edge(s) by one or more of its plane side portions.

The at least one exterior surface of the nozzle may comprise at least one surface area of a spherical sector of the nozzle. This is advantageous in that the nozzle hereby is configured to efficiently and conveniently smoothen out edges of the layer which also are inclined with respect to the elongation of the nozzle. In other words, the nozzle is configured to offer more freedom in smoothening inwards and/or outwards sloping walls.

The nozzle of the 3D-printing apparatus used in the method according to the invention may elongate along a first axis and may have a cylinder shape. This is advantageous in that the nozzle hereby is configured to efficiently and conveniently smoothen out edge(s) of the layer which peripheral edge is rounded.

The method according to the invention may further comprise the step of cooling the nozzle at least during the step of guiding of the nozzle along the peripheral edge of the at least one layer and on a predetermined distance into the at least one layer. For this purpose, the printer head of the 3D-printing apparatus used in the method may comprise a cooling unit which is in thermal contact with the nozzle and configured to cool the nozzle. By the term "cooling unit", it is here meant substantially any cooling unit, device, or the like, which furthermore is configured to cool the nozzle. This is advantageous in that the cooling of the nozzle may reduce the adhesion between the nozzle and the printed material during the guiding of the nozzle along the peripheral edge of the layer(s). The smoothening of the peripheral edge of the layer(s) may hereby be performed more efficiently.

The nozzle of the 3D-printing apparatus used in the method according to the invention may comprise a coating arranged to reduce the adhesion between the nozzle and the peripheral edge of the at least one layer. This is advantageous in that the nozzle may be guided along the peripheral edge of the layer(s) in an even more efficient way. The coating may comprise polytetrafluoroethylene, Teflon, or the like.

The nozzle of the 3D-printing apparatus used in the method according to the invention may be tiltable. In other words, the nozzle may be configured to be tilted, inclined, or the like. This is advantageous in that the tiltable nozzle may efficiently smoothen one or more layer edges which are inclined, e.g. those of a curved object.

In a second aspect of the present invention, there is provided a computer program comprising instructions which, when the program is executed by a 3D-printing apparatus, cause the 3D-printing apparatus to carry out the steps of the method according to the first aspect of the present invention.

In a third aspect of the present invention, there is provided a computer-readable data carrier having stored thereon the computer program according to the second aspect of the present invention.

Further objectives of, features of, and advantages with, the present invention will become apparent when studying the following detailed disclosure, the drawings and the appended claims. Those skilled in the art will realize that different features of the present invention can be combined to create embodiments other than those described in the following.

BRIEF DESCRIPTION OF THE DRAWINGS

This and other aspects of the present invention will now be described in more detail, with reference to the appended drawings showing embodiment(s) of the invention.

DETAILED DESCRIPTION OF THE EMBODIMENTS

Figure 1:
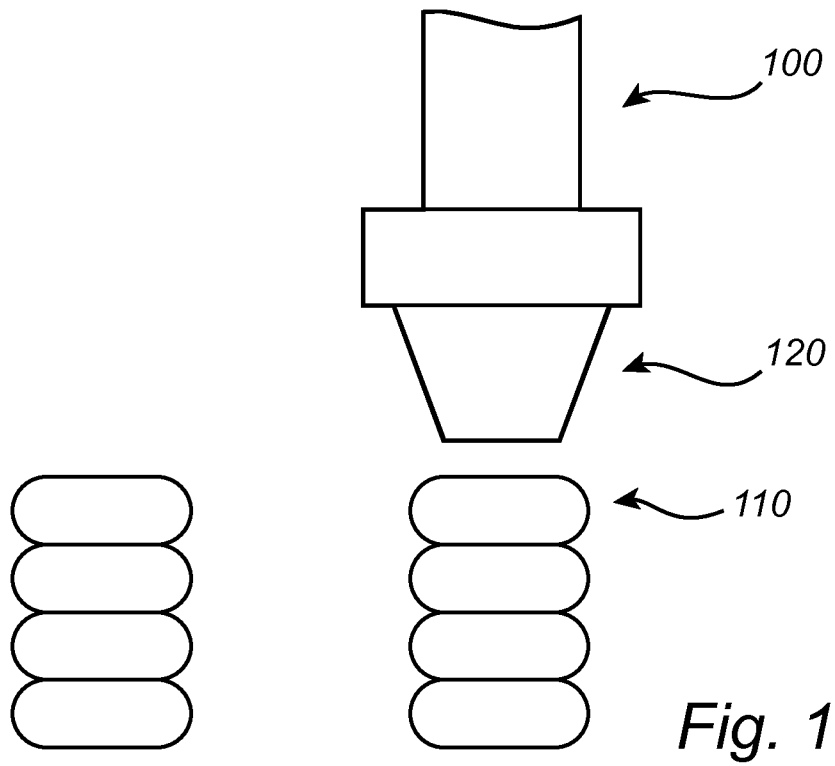
FIG. 1 is a schematic view of a printer head and a deposition of printing material by such a printer head according to the prior art.

FIG. 1 is a schematic view of a typical printer head 100 and a deposition of printing material 110 by such a printer head according to the prior art. The nozzle 120 of the printer head 100 is tapered in shape. The printing material, e.g. a molten plastic, is extruded from the bottom portion of the nozzle 120 and is provided as filaments which constitute one or more layers 110.

Figure 2:
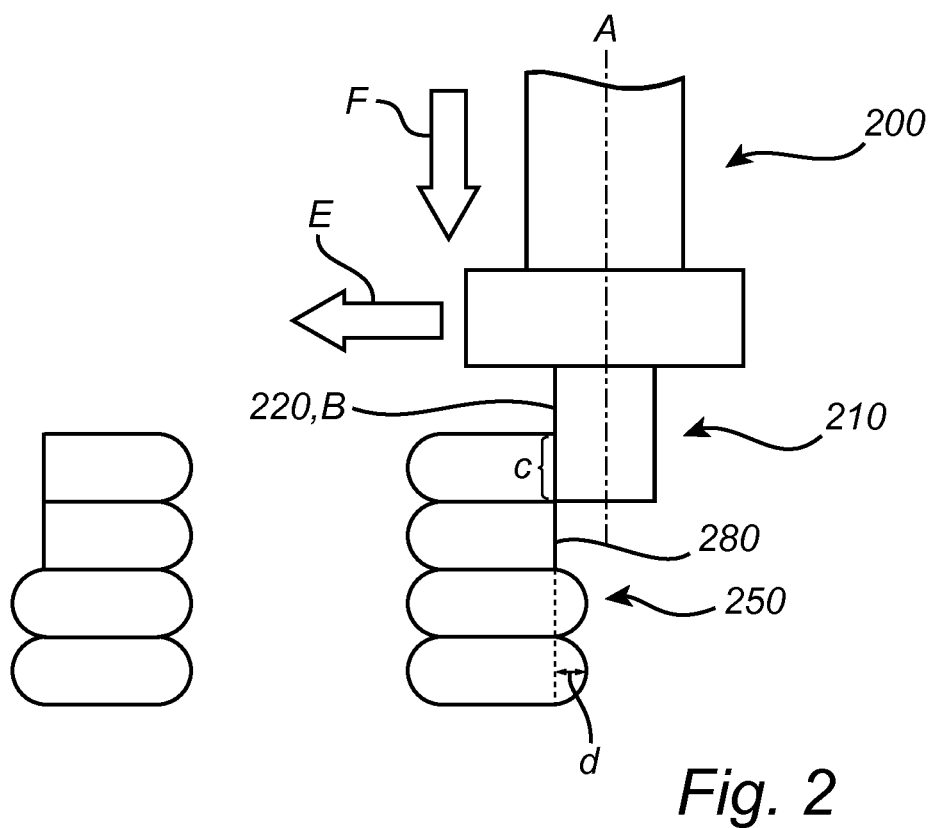
FIG. 2 is a schematic view of a printer head and a smoothening of printing material deposited by the printer head according to an exemplifying embodiment of the present invention.

FIG. 2 is a schematic view of a printer head 200 of a 3D-printing apparatus (not shown) that can be used in the method of the present invention. The printer head 200 comprises a nozzle 210 arranged to deposit one or more adjacently arranged filaments of printing material to form at least one layer 250 of an object to be produced by the 3D-printing apparatus. The nozzle 210, which in FIG. 2 elongates along a first axis A, comprises at least one exterior surface 220. Here, the exterior surface 220 comprises a form of a plane B which is parallel to the first axis A. After the printer head 200 has deposited the printing material into a layer 250, similarly to the deposition as shown in FIG. 1, the nozzle 210 is configured to be brought into abutting contact with the peripheral edge 280 of the layer 250. It will be appreciated that during this process, the nozzle 210 is not configured to dispense any printing material. The movement of the printer head 200 to come into the abutting contact with the printing material is indicated by the arrow E, being perpendicular to axis A. Hence, the movement of the printer head 200 as exemplified by the arrow E is parallel to the plane of the layer 250. The nozzle 210 is further configured to be guided along the peripheral edge 280 of the layer 250 and on a predetermined distance d into the layer 250. Hence, after each layer 250 has been printed, the nozzle 210 makes another pass over the print path, and the nozzle 210 is moved inwards (indicated by the arrow E) and downwards (indicated by the arrow F). In FIG. 2, the peripheral edge 280 of the layer 250 comprises a semi-spherical shape which projects in the plane of the layer 250, and the predetermined distance d corresponds to the radius of this semi-spherical shape. In other words, the predetermined distance d may correspond to the amplitude of the rounded profile of the peripheral edge 280 of the layer 250. The nozzle 210 may furthermore be configured to be guided a predetermined distance c in the direction as indicated by arrow F (i.e. parallel to the first axis A). Here, the distance c corresponds to the thickness of a layer 250, but it should be noted that c may correspond substantially any distance, e.g. to the thickness of a plurality of layers 250. Hence, the printer head 200 may be configured to first print at least one layer 250 and, subsequently, to smoothen out the at least one layer 250 by at least one of the movements of the nozzle 210 in one or both of the directions as indicated by arrows E and F. In other words, the nozzle 210 may be used both as an extruder and as a smoothening element. The nozzle 210 may be used for smoothening out the deposited layer(s) 250, wherein the exterior surface(s) 220 of the nozzle 210 may be guided along the peripheral edge(s) 280 of the layer(s) 250 after the layer(s) 250 has (have) been printed.

It will be appreciated that the printer head 200 may furthermore comprise a wheel in the shape of a cylinder rotationally coupled to the nozzle 210, and configured to rotate around the nozzle 210 and the first axis A. In other words, at least a portion of the nozzle 210 elongating along the first axis A may be enclosed by the cylinder-shaped wheel which is configured to rotate around the nozzle 210. The wheel of the printer head 100 may be configured to be brought into abutting contact with at least one peripheral edge 280 of the at least one layer during operation of the printer head 200, and may hereby rotate when guided along the at least one peripheral edge 280 of the at least one layer 250. It will be appreciated that the wheel may comprise, or consist of, one or more materials which properties are beneficial for the ability of the wheel to smoothen out the deposited layer(s) 250. For example, the material(s) of the wheel may provide a relatively low friction coefficient between the wheel and the layers 250, a relatively low surface energy (i.e. a non-sticky surface) and/or a relatively high heat resistance. Examples of materials of the wheel may be polytetrafluoroethylene (PTFE), graphite, or the like.

Figure 3:
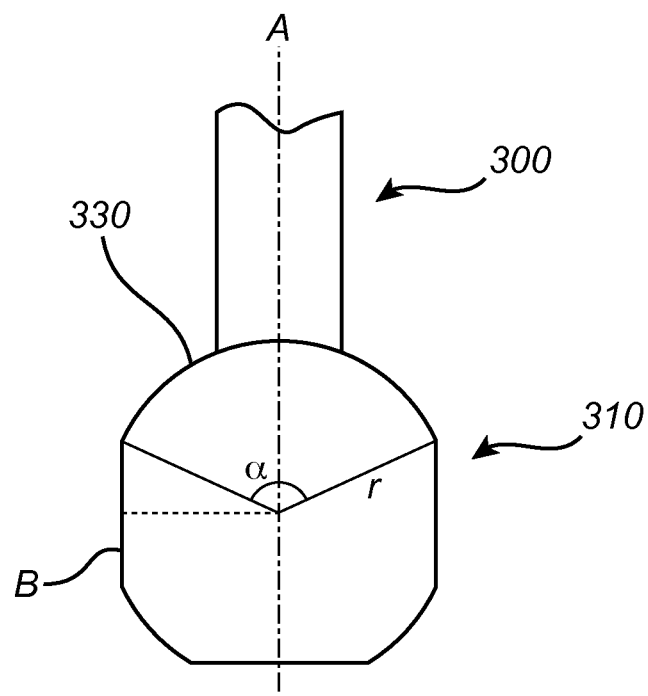
FIG. 3 is a schematic view of a printer head suitable for use in the method of the present invention.

FIG. 3 is a schematic view of a printer head 300 according to an exemplifying embodiment of the present invention. Here, the nozzle 310 of the printer head 300 elongates along a first axis A, wherein a portion of the exterior surface of the nozzle 310 has the form of a plane B which is parallel to the first axis A. Furthermore, the exterior surface of the nozzle 310 comprises at least one surface area 330 of a spherical sector of the nozzle 310, wherein the spherical sector has angle α and radius r.

Figure 4:
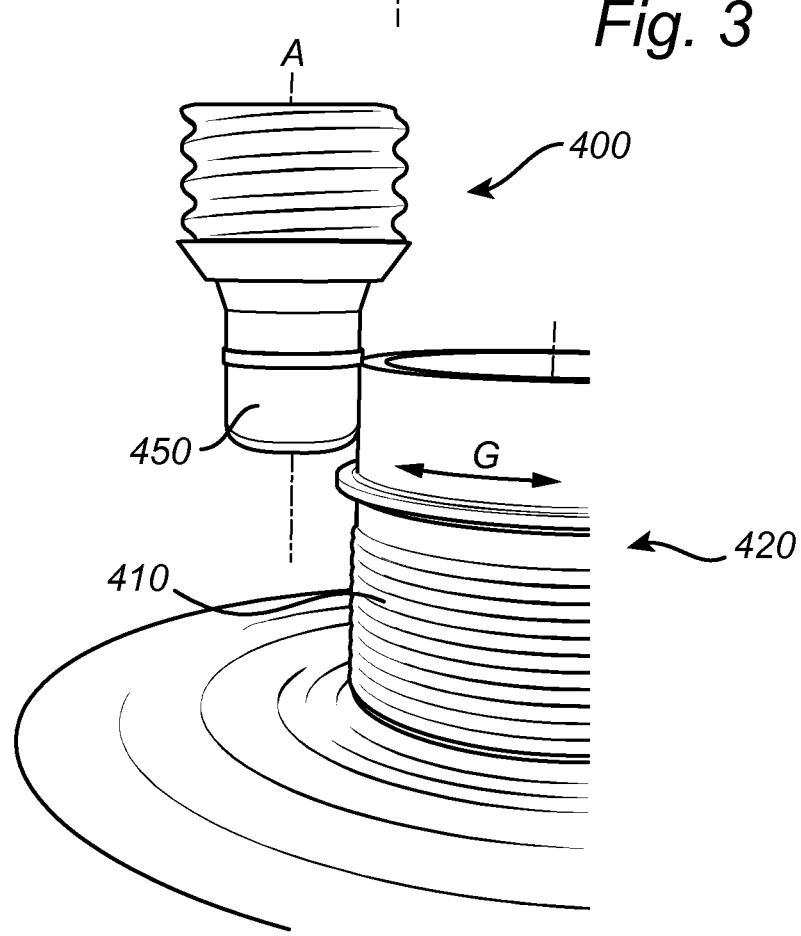
FIG. 4 is a schematic view of a printer head and a smoothening of layers of an object by the printer head, according to an exemplifying embodiment of the present invention.

FIG. 4 is a schematic view of a printer head 400 and a smoothening of layers 410 of an object 420, according to an exemplifying embodiment of the present invention. The printer head 400 of the 3D-printing apparatus (not shown) has deposited a plurality of adjacently arranged filaments of printing material to form a plurality of layers, which in turn constitute an object 420 produced by the 3D-printing apparatus. The nozzle 450 of the printer head 400 elongates along a first axis A and has substantially the shape of a cylinder. After the creation of one or more layers 410 of the object 420, the nozzle 450 of printer head 400 has been brought into abutting contact with the peripheral edge of the at least one layer 410 of the object 420. The nozzle 450 is thereafter guided in the circumferential direction G along at least a portion of the peripheral edge of the layer(s) 410. In other words, each printed layer 410 is smoothed by pressing the smooth, vertical surface of the nozzle 450 against the outer, vertical wall of the printed object 420. During this process, the nozzle 450 does not dispense any printing material. Furthermore, the nozzle 450 may be configured to penetrate a predetermined distance into the at least one layer 410. It will be appreciated that the nozzle 450 may be cooled at least during the guiding of the nozzle 450 in the circumferential direction G.

Figure 5:
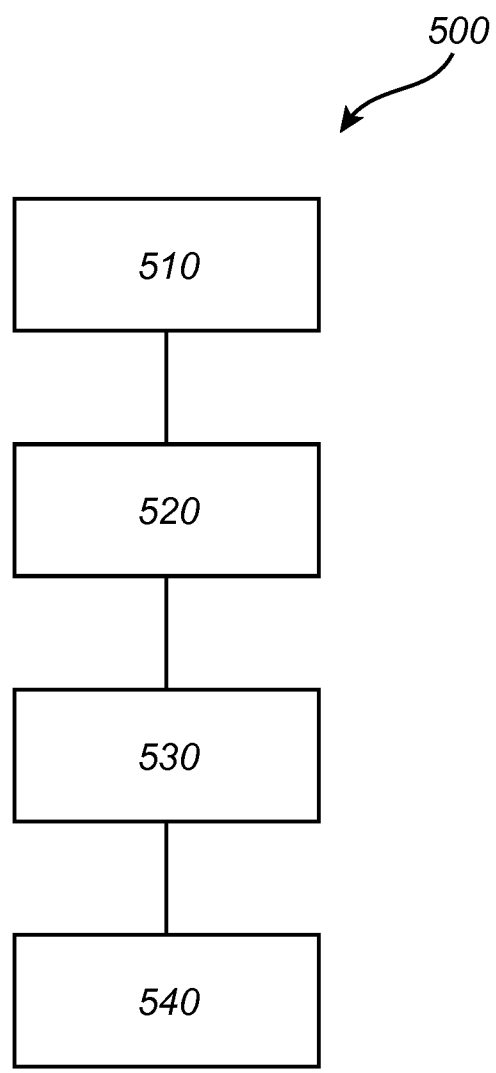
FIG. 5 is a schematic flow chart diagram of a method according to an exemplifying embodiment of the present invention.

FIG. 5 is a schematic flow chart diagram of a method 500 according to an exemplifying embodiment of the present invention. The method 500 comprises the step 510 of providing a 3D-printing apparatus comprising a printer head according to any one of the previously described embodiments. The method 500 further comprises the step 520 of depositing one or more adjacently arranged filaments of printing material to form at least one layer of an object to be produced. The method 500 further comprises the step 530 of bringing at least one exterior surface of the nozzle into abutting contact with the peripheral edge of the at least one layer. Furthermore, the method 500 comprises the step 540 of guiding the nozzle along at least a portion of the peripheral edge of the at least one layer and on a predetermined distance d into the at least one layer.

The person skilled in the art realizes that the present invention by no means is limited to the preferred embodiments described above. On the contrary, many modifications and variations are possible within the scope of the appended claims. For example, it will be appreciated that the figures are merely schematic views of printer heads according to embodiments of the present invention. Hence, any elements/components of the printer heads 200, 300, 400 and/or nozzles 210, 310, 450 may have different dimensions, shapes and/or sizes than those depicted and/or described.

The invention claimed is:

1. An extrusion-based additive manufacturing method for manufacturing an object using a 3D-printing apparatus, wherein the 3D-printing apparatus comprises a nozzle arranged to deposit one or more adjacently arranged filaments of printing material, and wherein the method comprises the steps of:
    depositing the one or more adjacently arranged filaments of printing material to form at least one layer of the object,
    bringing at least one exterior surface of the nozzle into abutting contact with a peripheral edge of the at least one layer;
    guiding the nozzle along at least a portion of the peripheral edge of the at least one layer and on a predetermined distance into the at least one layer; and
    cooling the nozzle at least during the step of guiding of the nozzle along the peripheral edge of the at least one layer and on a predetermined distance into the at least one layer.

2. The method according to claim 1, wherein the nozzle elongates along a first axis, and wherein the method further comprises the step of:
    guiding the nozzle a predetermined distance along the first axis.

3. An extrusion-based additive manufacturing method for manufacturing an object using a 3D-printing apparatus, wherein the 3D-printing apparatus comprises a nozzle which elongates along a first axis and is arranged to deposit one or more adjacently arranged filaments of printing material, and a wheel in the shape of a cylinder rotationally coupled to the nozzle, and wherein the method comprises the steps of:
    depositing the one or more adjacently arranged filaments of printing material to form at least one layer of the object,
    bringing at least one exterior surface of the nozzle into abutting contact with a peripheral edge of the at least one layer;
    guiding the nozzle along at least a portion of the peripheral edge of the at least one layer and on a predetermined distance into the at least one layer in a direction parallel to a plane of the at least one layer; and
    rotating the wheel around the nozzle and the first axis while guiding the wheel along at least a portion of the peripheral edge of the at least one layer and on the predetermined distance into the at least one layer.

* * * * *